United States Patent
Huck et al.

(10) Patent No.: US 10,023,964 B2
(45) Date of Patent: Jul. 17, 2018

(54) BREAK-RESISTANT ANODE ASSEMBLIES FOR CATHODIC PROTECTION SYSTEMS AND METHODS OF INSTALLING THE SAME

(71) Applicant: MATCOR, INC., Chalfont, PA (US)

(72) Inventors: Theodore Andrew Huck, Berwyn, PA (US); William Raymond Schutt, Doylestown, PA (US); Knut Thomas Fenner, Doylestown, PA (US)

(73) Assignee: Matcor, Inc., Chalfont, PA (US)

( * ) Notice: Subject to any disclaimer, the term of this patent is extended or adjusted under 35 U.S.C. 154(b) by 230 days.

(21) Appl. No.: 14/758,407

(22) PCT Filed: Jan. 10, 2014

(86) PCT No.: PCT/US2014/011015
§ 371 (c)(1),
(2) Date: Jun. 29, 2015

(87) PCT Pub. No.: WO2014/110351
PCT Pub. Date: Jul. 17, 2014

(65) Prior Publication Data
US 2015/0329975 A1    Nov. 19, 2015

Related U.S. Application Data

(60) Provisional application No. 61/751,069, filed on Jan. 10, 2013, provisional application No. 61/762,549, filed on Feb. 8, 2013.

(51) Int. Cl.
*C23F 13/02* (2006.01)
*C23F 13/18* (2006.01)
(Continued)

(52) U.S. Cl.
CPC ............. *C23F 13/18* (2013.01); *C23F 13/10* (2013.01); *E21B 7/046* (2013.01); *E21B 7/20* (2013.01);
(Continued)

(58) Field of Classification Search
CPC .......... C23F 13/02; C23F 13/06; C23F 13/08; C23F 13/10; C23F 13/18;
(Continued)

(56) References Cited

U.S. PATENT DOCUMENTS 2,766,501 A    10/1956    Kellems
3,196,101 A *  7/1965    Hosford, Jr. ............ C23F 13/18
                                                        204/196.34
(Continued)

FOREIGN PATENT DOCUMENTS

DE    19937920 A1    3/2001
EP    0118140 A1     9/1984
(Continued)

OTHER PUBLICATIONS

Machine Translation of FR 1149844 (1958).*
International Search Report for PCT/US2014/011015, dated Oct. 29, 2014.

*Primary Examiner* — Edna Wong
*Assistant Examiner* — Alexander W Keeling
(74) *Attorney, Agent, or Firm* — Caesar Rivise, PC

(57) ABSTRACT

Various break-resistant anode assemblies and method of installing the same in the ground are disclosed. Each anode assembly (20) basically comprises an anode (22), at least one pulling cable (24), and a protective nose cone (26). The nose cone is a hollow member receiving the leading end (22A) of the anode and from which the anode's electrical conductor (28) extends. The nose cone includes a tapered leading surface (32) that facilitates and guides the anode (Continued)

assembly as it is pulled through the ground, while protecting the anode. A break-away mechanism (54) may also be provided to ensure that no more than a maximum pulling force is applied to the anode assembly during its installation to ensure that the anode is not damaged.

16 Claims, 3 Drawing Sheets

(51) Int. Cl.
    *E21B 7/04*     (2006.01)
    *E21B 7/20*     (2006.01)
    *H02G 1/08*     (2006.01)
    *C23F 13/10*     (2006.01)

(52) U.S. Cl.
    CPC ......... *H02G 1/081* (2013.01); *C23F 2213/30* (2013.01); *Y10T 29/49004* (2015.01)

(58) Field of Classification Search
    CPC .. C23F 2213/30–2213/32; E21B 7/046; E21B 7/20; H02G 1/081
    See application file for complete search history.

(56) References Cited

U.S. PATENT DOCUMENTS

| | | | | |
|---|---|---|---|---|
| 3,616,418 A | * | 10/1971 | Anderson | C23F 13/02 204/196.35 |
| 3,992,570 A | * | 11/1976 | Beinhaur | F16L 17/10 138/89 |
| 4,292,149 A | * | 9/1981 | Warne | C23F 13/16 204/196.2 |
| 5,301,595 A | * | 4/1994 | Kessie | F16J 15/22 277/651 |
| 5,507,795 A | * | 4/1996 | Chiang | A61B 17/32078 606/167 |
| 6,039,325 A | * | 3/2000 | Steinetz | F16J 15/0812 277/528 |
| 6,261,439 B1 | * | 7/2001 | Schwabe | C23F 13/04 204/196.01 |

FOREIGN PATENT DOCUMENTS

| | | | | |
|---|---|---|---|---|
| FR | 1149844 A | * | 1/1958 | ............... C23F 13/10 |
| GB | 2089008 A | * | 6/1982 | ............... D07B 1/18 |
| WO | 2008139190 A1 | | 11/2008 | |
| WO | 2011068292 A1 | | 6/2011 | |

\* cited by examiner

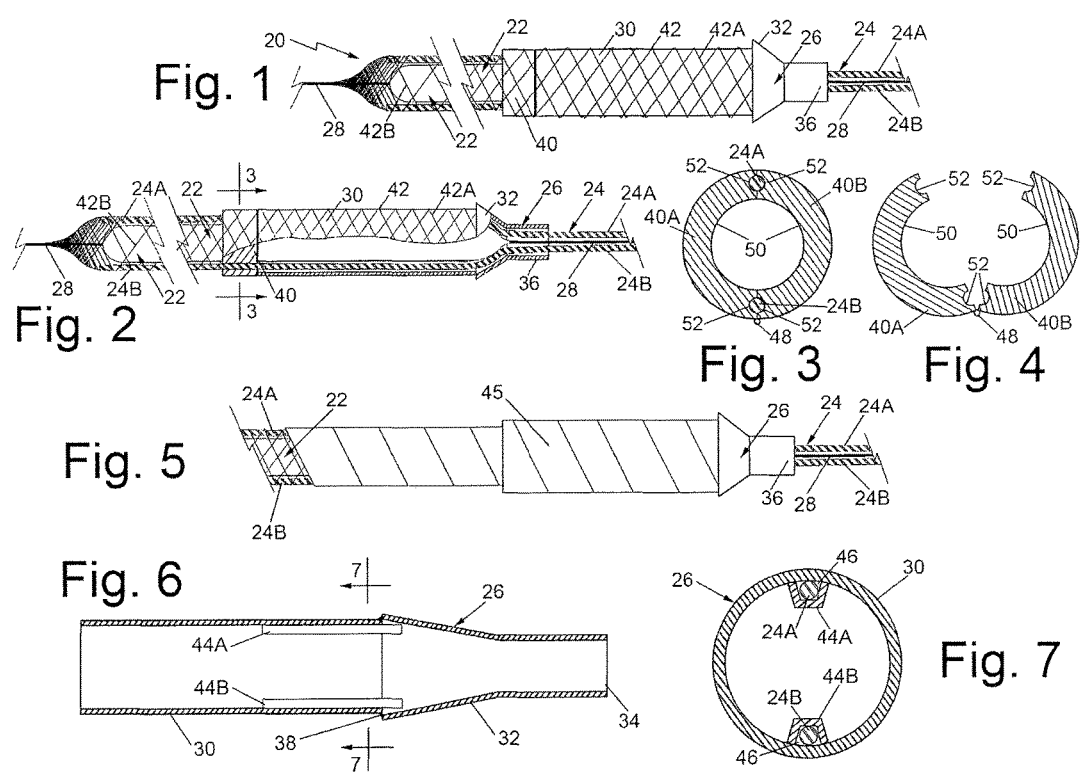

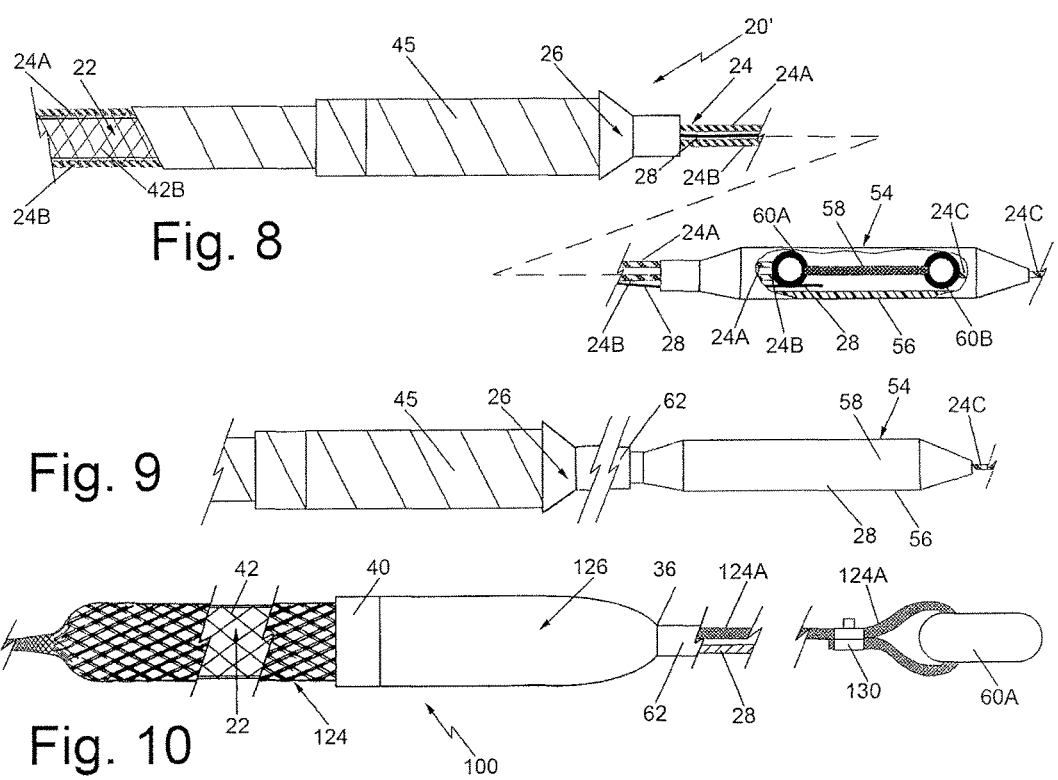

BREAK-RESISTANT ANODE ASSEMBLIES FOR CATHODIC PROTECTION SYSTEMS AND METHODS OF INSTALLING THE SAME

CROSS-REFERENCE TO RELATED APPLICATIONS

This PCT application claims the benefit under 35 U.S.C. § 119(e) of Provisional Application Ser. No. 61/751,069, filed on Jan. 10, 2013, entitled Break-Resistant Anode Assembly For Cathodic Protection Systems And Method Of Installing The Same and Ser. No. 61/762,549, filed on Feb. 8, 2013, entitled Break-Resistant Anode Assembly For Cathodic Protection Systems And Method Of Installing The Same, whose entire disclosures are incorporated by reference herein.

FIELD OF THE INVENTION

This invention relates generally to cathodic protection systems and more particularly to break resistant anode assemblies for horizontal directional drilling applications and methods of installing the same.

BACKGROUND OF THE INVENTION

Cathodic protection systems commonly make use of packaged linear anodes having a variety of shapes (e.g., round, flat, or other shapes) and may be either a polymeric cable anode or a Mixed Metal Oxide (MMO) wire anode housed inside a braided or unbraided fabric housing filled with conductive backfill. These commercially available fabric-based linear anodes are similar in design and function. One particularly useful packaged linear anode for cathodic protection systems is commercially available from Matcor, Inc., the assignee of the subject invention, under the trademark SPL-FBR.

Increasingly, linear anodes are being used in conjunction with horizontal directional drilling (HDD) technology for installation. While such prior art anodes are suitable for various applications, they are not particularly suited for HDD applications inasmuch as they are prone to damage if the pulling force applied to them exceeds the pull strength of the packaged linear anode assembly. Thus, various techniques have been developed or used to attempt to minimize the potential for damaging/breaking conventional socked linear anodes during installation. One such technique entails making use of a separate, larger diameter cable with greater pull strength in conjunction with the packaged linear anode and pulling them together through the hole. Another technique entails using an oversized drill hole and additional drilling fluids to try and lubricate the hole ("muddying up the hole") to reduce the pulling stress on the packaged linear anode. Still another technique entails using an in-line break-away swivel to protect against over pulling the anode during installation. Yet another technique entails installation of a temporary plastic conduit pipe to case the hole and then pulling the anode through the conduit pipe casing. Once installed, the casing is pulled back out and can be reused for another pull while the anode remains in place.

All of these are workaround solutions that attempt to overcome the inherent design weaknesses of all current packaged linear anode products available on the market. Thus, a need exists for an anode assembly which overcomes the disadvantages of the prior art.

The subject invention addresses that need. In particular, the subject anode assembly is designed specifically for HDD installation and incorporates a special pulling head or nose cone and integral pulling cable system, e.g., two pulling cables, to significantly increase the pulling strength of the assembly to minimize the possibility of it breaking during installation using HDD equipment.

SUMMARY OF THE INVENTION

In accordance with one aspect of this invention an anode assembly, is provided for a cathodic protection system. The anode assembly arranged to be pulled through the ground for installation in the cathodic protection system and basically comprises an anode, a nose cone, and at least one pulling cable. The anode comprising an elongated body having a leading end portion from which an electrical conductor extends and a trailing end portion from which an electrical conductor extends. The nose cone comprises a tubular member having a leading portion and a trailing portion. The leading portion has an open free end and a sidewall portion tapering in a direction from the trailing portion towards the open free end. The nose cone is fixedly secured to the at least one pulling cable. The leading end portion of the anode is located within the nose cone with the electrical conductor extending out of the open free end. The at least one pulling cable has a leading portion and a trailing portion. The trailing portion of the at least one pulling cable extends along at least a portion of the length of the anode and through the nose cone, with the leading portion of the at least one pulling cable extending out of the open free end of the nose cone to enable the anode assembly to be pulled through the ground by a pulling force applied thereto.

In accordance with one aspect of this invention the anode assembly comprises a braided sleeve comprising a first plurality of closely adjacent coils, with the first plurality of closely adjacent coils forming the sidewall portion of said nose cone.

In accordance with another aspect of this invention the cone is a solid tubular member and the anode assembly comprises a braided sleeve, with a portion of the braided sleeve forming the at least one pulling cable.

In accordance with another aspect of this invention the anode assembly has a predetermined pulling strength and the anode assembly additionally comprises a break-away mechanism connected to the portion of the at least one pulling cable and arranged to break if the predetermined pulling strength is reached to prevent damage to the anode assembly.

In accordance with another aspect of the invention there is provided a method of installing an anode within the ground for a cathodic protection system. That method basically entails providing an anode assembly comprising an anode, a nose cone, and at least one pulling cable, with the anode comprising an elongated body having a leading end portion from which an electrical conductor extends and a trailing end portion from which an electrical conductor extends, with the nose cone comprising a tubular member having a trailing portion and leading portion having an open free end, and with the leading portion of the nose cone tapering in a direction from the trailing portion of the nose cone towards the open free end. The leading end portion of said anode is disposed within the nose cone with the electrical conductor extending out of the open free end and with the at least one pulling cable extending along at least a portion of the length of anode and through the nose cone, whereupon a leading portion of the pulling cable extends out of the open free end of the nose cone. The nose cone is fixedly secured to the at least one pulling cable. After that has been accomplished, the cable assembly is disposed within the ground and a pulling force is applied to the leading portion of the at least one pulling cable to pull the anode assembly through a path in the ground to effect its installation.

DESCRIPTION OF THE DRAWING

FIG. 1 is a side view, partially in section, of one exemplary embodiment of a break resistant anode assembly constructed in accordance with this invention;

FIG. 2 is a view similar to FIG. 1 but showing more details of the interior of the anode assembly of FIG. 1, e.g., the anode, two pulling cables, a clamp and a protective nose cone;

FIG. 3 is an enlarged sectional view taken along line 3-3 of FIG. 2 showing the clamp of the anode assembly;

FIG. 4 is a sectional view, like that of FIG. 3, but showing the clamp in its open state;

FIG. 5 is a side view showing a portion of the anode assembly of FIG. 1 shown including an optional tape wrapping;

FIG. 6 is a longitudinal sectional view of preferred nose cone including two pulling cable guides forming a portion of the assembly of FIG. 1;

FIG. 7 is an enlarged sectional view taken along line 7-7 of FIG. 6, but with respective pulling cables shown disposed within respective pulling cable guides;

FIG. 8 is a side view, partially in section, of an alternative anode assembly including;

FIG. 9 is a view similar to FIG. 7, but showing the leading end of the assembly of FIG. 7 with a heat shrink sleeve disposed about the leading end portion of the assembly;

FIG. 10 is a side view partially in section of still another alternative anode assembly in accordance with this invention, with this embodiment also making use of a break-away mechanism arranged to break if the pulling strength of the anode assembly is exceeded.

DETAILED DESCRIPTION OF THE PREFERRED EMBODIMENT

Figure 11:
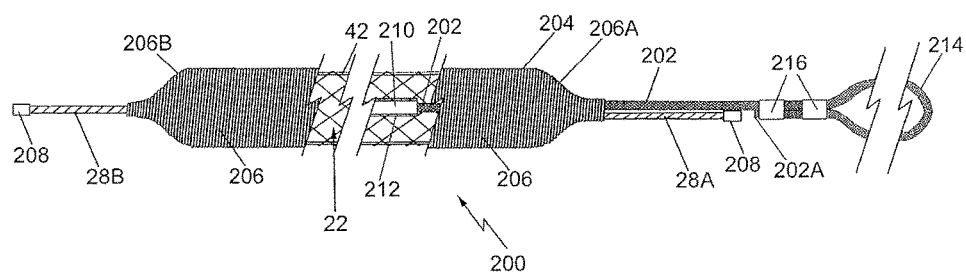
FIG. 11 is a side view partially in section of another, and most preferred, alternative anode assembly in accordance with this invention.

Referring now to the various figures of the drawing wherein like reference characters refer to like parts, there is shown at 20 in FIG. 1 one exemplary embodiment of an anode assembly 20 constructed in accordance with the subject invention. The assembly 20 basically comprises an anode 22, at least one pulling cable 24 and a protective nose cone 26. The anode 22 can be of any suitable construction. In one preferred embodiment it comprises a SPL-FBR anode available from Matcor, Inc. That anode is a MMO linear anode that is factory packaged with coke backfill in a porous, cloth housing. The anode includes an electrical conductor 28, a portion of which extends out the leading end 22A (FIG. 2) of the anode 22 and another portion of which extends out the trailing end 22B of the anode. The anode 22 can be of any length, from 10 feet to lengths of more than 1,000 feet.

In the exemplary embodiment shown the at least one pulling cable 24 comprises two identical pulling cables 24A and 24B. It should be pointed out at this juncture that such an arrangement is merely exemplary. Thus, the anode assembly of this invention can make use of one, two, three or more pulling cables. If more than one pulling cable is used, they are extended parallel to each other and preferably equidistantly spaced from each other. Irrespective of the number of cable(s) used, it(they) is/are arranged to have a pulling force applied to it/them to pull the anode assembly through the ground, e.g., through drilled soil. To that end, each of the cables used includes a leading or upstream end to which the pulling force may be applied, and trailing or downstream end.

The nose cone 26 is mounted on the leading end of the anode 22. The nose cone serves to protect the anode as it is pulled through the ground by the pulling cables. In addition, the nose cone 26 provides a guide for the anode 22, the conductor cable 28 and the pulling cables 24A and 24B. To that end, the nose cone 26 is shaped to provide a clearing mechanism as the assembly is pulled through drilled soil. In particular, as best seen in FIGS. 1, 2, 6 and 7, the nose cone basically comprises a hollow, solid-walled tubular member, formed of a strong and impact resistant material, e.g., steel. It includes a trailing end portion 30 and a leading end portion 32. The trailing end portion 30 comprises a circular side wall 30A (FIGS. 1 and 7), the inside diameter of which is slightly larger than the outside diameter of the anode 22. The leading end portion 32 of the nose cone is in the form of a tapering, e.g., conical, side wall 32A having an open free end 34 (FIG. 2). The side wall 32 tapers in a direction from the trailing end portion 30 of the nose cone towards the open free end 34. In the exemplary embodiment shown the free end of the nose cone is in the form of a circular side wall 36, whose diameter is less than that of the trailing end portion of the nose cone and whose free end is open at 34. The nose cone can be fabricated in various ways. For example, it may be made up of two individual components, i.e., the trailing end portion and the leading end portion, which are welded together along a peripheral weld line 38 (FIG. 6) to form an integral unit, or it may be directly formed as an integral unit.

The two pulling cables 24A and 24B are secured to and extend parallel to each other along the entire length of the anode 22. The securement of the cables to the anode is achieved by means of one or more clamps 40 (to be described later). The cables 24A and 24B are formed of strong, yet somewhat flexible material, e.g., steel, or other metals or non-metals, and each is of a small diameter, e.g., 0.25 inch, so that it may easily fit with the anode within the trailing end portion 30 of nose cone 26. It is also contemplated that the pulling cables may be located within the body of the anode, instead of extending outside of it. In any case, the leading end portions of each of the pulling cables 24A and 24B extend out of the open free end 34 of the nose cone 26, with those portions extending parallel to each other and with the leading end of the electrical conductor 28 interposed therebetween. The length of the leading end portions of the pulling cables and the leading end portion of the electrical conductor exiting from the free end of the nose cone can be whatever is desired for the particular application. In one exemplary embodiment of this invention those portions of the pulling cables and electrical conductor are 10 feet long.

As best seen in FIGS. 1 and 2 an external braiding 42, such as PVC coated high strength yarn (e.g., like the type used in the Matcor SPL-FBR anode), is disposed about the leading end portion of the anode and the portion of the pulling cables 24A and 24B disposed within the nose cone and for some length of the anode and cables located downstream (to the rear) of the nose cone. In particular, for one exemplary embodiment of this invention, the first twelve inches measured of the leading end portion of the anode is covered with a double wrap braiding 42A, while the remainder of the anode is covered by a single wrap braiding 42B.

As shown in FIG. 5, the trailing end portion of the nose cone and a portion of the assembly located immediately downstream (i.e., to the rear) of the nose cone may be covered by a tape wrapping 45 for cosmetic purposes. The tape can be any suitable material, such as PVC tape, vinyl tape, etc.

Turning now to FIGS. 6 and 7, the details of one exemplary embodiment of a nose cone constructed in accordance with this invention will now be described. That nose cone includes a pair of elongated channel-like guide members 44A and 44B extending parallel to each other along diametrically disposed portions of the side wall 30 making up the trailing end of the nose cone 26. Each of those guide members is formed of steel or some other material and includes a raceway 46 adapted to receive a portion of an associated pulling cable to ensure that the pulling cables remain spaced from each other.

As mentioned earlier the clamp 40 is provided to secure the nose cone to the cables 24A and 24B. The clamp 40 is located abutting the trailing end of the nose cone 26 and, like that portion of the nose cone, is covered by the double braiding 42A. As best seen in FIGS. 3 and 4, the clamp 40 basically comprises a clam-shell like body having a pair of pivotably connected members 40A and 40B which are arranged to be moved from an open position like shown in FIG. 4 to a closed position like shown in FIG. 1 to tightly sandwich the cables between it and the anode. To that end, the members 40A and 40B are connected via a hinge 48. Each member 40A and 40B includes a semi-circular recess 50 (FIG. 4), which when the members are in the closed position conjoin to form a circular opening whose inside diameter is approximately the same as the outside diameter of the anode to accommodate the anode therein. Each of the members 40A and 40B also include a pair of diametrically opposed small diameter semi-circular recesses 52 (FIG. 4), which when the members are in the closed position conjoin to form a pair of circular openings whose inside diameter is approximately the same as the outside diameter of the pulling cables 24A and 24B to accommodate respective ones of the cables therein.

As should be appreciated by those skilled in the art when the clamp 40 is in the closed position it is fixedly secured to the anode 22 and to the pulling cables 24A and 24B. Thus, since the clamp 40 is located abutting the trailing end of the nose cone 26, any pulling force applied to the leading end of the cables will be transferred to the nose cone, thereby pulling the assembly 20 as a unit through the ground. In addition, if desired, a plurality of clamps can be used located at equally spaced points along the length or a portion of the length of the anode to connect the anode to the pulling cable (s) at those points and thus distribute the pulling force applied to the assembly.

Turning now to FIGS. 8 and 9 there is shown another exemplary embodiment of the invention. That assembly is designated by the reference number 20' and is basically the same construction as the assembly 20 described heretofore, except for the inclusion of a break-away mechanism 54 to ensure that the pulling force applied to the assembly will not exceed a predetermined pulling strength which could damage the anode assembly. Since the assembly 20' is of the same construction as assembly 20 the common details of those assemblies will be given the same reference numbers and will not be discussed further in the interest of brevity. The break-away mechanism basically comprises a body 56 in which a breakable link 58 is located. The trailing end of the breakable link is fixedly secured to a swivel 60A, while the leading end of the breakable link is fixedly secured to a swivel 60B. The swivel 60A is in turn fixedly secured to the leading end of the two pulling cables 24A and 24B. The swivel 60B is in turn fixedly secured to the trailing end of another pulling cable 24C. The cable 24C is similar to the cables 24A and 24B and serves as the means for applying a pulling force to the break-away mechanism and hence to the anode assembly 20'. The link breakable link 58 is chosen to have a breaking strength at a level, e.g., 1500 lbs., which will ensure that the breaking strength of the anode is not exceeded when a pulling forced is applied to the pulling cable 24C. In particular, if an excessive pulling force is applied, the breakable link 58 will break, thereby preventing any damage to the anode.

In accordance with one exemplary embodiment of this invention the breakable link and its associated swivels is purchased as a unit from Condux, International, Inc., under its model numbers 08021500, 08019400, 08019500, with a break-load between 1,000 and 2,000 pounds. Other units from other suppliers can be used as well. Irrespective of the unit, it is disposed within the housing 56, which is formed of any suitable plastic material, preferably molded in two halves and secured to each other to form a hollow interior in which the breakable link unit is disposed, and which is approximately 7 inches long and 1.5 inches in outside diameter. In order to facilitate the pulling of the assembly 20' through the ground the housing 56 is in the general shape of a submarine having a tapered leading end and a tapered trailing end. The break-away mechanism 54 can be located any distance from the nose cone 26. In the above described exemplary embodiment it is located approximately ten feet in front of the nose cone and the portion of the extending pulling cables 24A and 24B and the extending electrical conductor 28 up to the trailing end portion of the break-away mechanism's housing 56 is preferably covered and protected by a heat shrink tubing 62.

Turning now to FIG. 10 there is shown another alternative embodiment of the anode assembly 100 of this invention. The assembly 100 is constructed similarly to the anode assemblies 20 and 20' except that the pulling cable of the anode assembly 100 is formed of a braided sleeve (to be described shortly). In the interest of brevity the components of the assembly 100 which are common to the assemblies 20 and 20' will be given the same reference numbers and all of the details of their construction and operation will not be reiterated. Thus, as can be seen in FIG. 10 the assembly 100 basically comprises an anode 22, a single pulling cable 124 and a protective nose cone 126. The anode includes an electrical conductor 28, a portion of which extends out the leading end 22A of the anode 22 and another portion of which extends out of the trailing end of the anode. The nose cone 126 is similar in many respects to the nose cone 26, i.e., is a solid-walled tubular member, but is of slightly different shape, e.g., it is of a bullet-like shape whose leading tapered end is rounded. Moreover, it doesn't include any channel-like guide members 44A and 44B since it makes use of a single pulling cable 126

In the exemplary embodiment shown the pulling cable basically comprises a braided sleeve 124 which extends for the entire length of the anode 22 over the PVC braiding 42. If desired, a clamp 40 can be used to secure the braided sleeve 124 to the nose cone 126. The wire strands making up the braided sleeve 124 constrict or merge towards each other as they exit the open end 36 of the nose 126 cone to thereby form a single braided cable 124A. The wire strands making up the braided sleeve are preferably carbon steel and can be coated, if desired, with brass or nickel, or may be formed of stainless steel or any other strong, flexible non-steel material, such as carbon fiber. The braided sleeve may be single or multi-stranded. In one exemplary embodiment the braided sleeve 124 is multi-stranded, e.g., formed of six strands of high tensile strength steel wire, each having a diameter of approximately 0.012 in. That sleeve is similar to conventional braided washing machine hoses. A braided sleeve constructed in that manner provides very good stability and pull strength, e.g., up to 1,200 lbs. or more.

The leading end of the anode conductor 28 exits the nose cone 126, via the open end 36, and extends parallel to the braided cable 124 for connection to the cathodic protection system.

The leading end of the braided cable 124A is connected to the swivel 60A forming a portion of the break-away mechanism 54 (the remainder of which mechanism is not shown in FIG. 10). In particular, the free end of the braided cable 124A is threaded through the swivel 60A and looped back over itself and secured in place by one or more cable clamps 130. The other swivel 60B of the break-away mechanism 54 is connected to another pulling cable, e.g., like cable 24C, as described with respect to the embodiment 20'. The break-away mechanism 54 can be located any distance from the nose cone 126. In the above described exemplary embodiment it is located approximately 10 feet in front of the nose cone and the portion of the extending braided pulling cable 124A the extending electrical conductor 28 up to the trailing end portion 124A of the break-away mechanism's housing 56 is preferably covered and protected by a heat shrink or other tubing 62 that houses the cables exiting the nose cone for connection to the swivel and providing strength for the wire clamp(s) connected to the cable. If desired, a section of steel cable, not shown, may be included in the last four feet of the hollow braided cable to provide additional strength for the connection to the swivel 60A.

Turning now to FIG. 11 there is shown another alternative, and most preferred, embodiment of the anode assembly 200 of this invention. The assembly 200 is constructed similarly to the anode assembly 100, except for the construction of the nose cone and the pulling cable. In the interest of brevity the components of the assembly 200 which are common to the assembly 100 will be given the same reference numbers and all of the details of their construction and operation will not be reiterated. Thus, as can be seen in FIG. 11 the assembly 200 basically comprises an anode 22, a single pulling cable 202 and a protective nose cone 204. The nose cone 204 is formed by portion of a braided sleeve 206. The braided sleeve 206 extends for the entire length of the anode 22 over the PVC braiding 42 and in tight engagement therewith. The braided sleeve includes a leading portion 206A, a trailing portion 206B and an intermediate portion (not shown). The leading portion 206A of the braided sleeve is tightly braided, i.e., is formed by a first plurality of closely adjacent coils of the wires making up the braid. This tightly braided portion of the sleeve forms the nose cone 204, whose leading free end is open. The braided portion of the sleeve forming the nose cone 204 is located over the leading end portion of the anode 22. The trailing portion 206B of the braided sleeve is formed by a second plurality of closely adjacent coils of the wires making up the braid and is located over the trailing end portion of the anode 22 and terminates in an open trailing free end. The intermediate portion of the braided sleeve is located between the leading portion 206A and the trailing portion 206B and is made up of a plurality of wider spaced coils of the wires making up the braid. The wires making up the braid can be of any suitable construction, one exemplary preferred material comprises 28 gauge stainless steel (type 304) wires.

The anode 22 includes an electrical conductor, a portion of which 28A extends out the leading end 22A of the anode 22 and through the open leading free end of the nose cone 204. The electrical conductor includes another portion 28B which extends out of the trailing end of the anode and through the open trailing free end of the braided sleeve. The free end of the leading conductor 28A is covered by a removable protective cap 208. The free end of the trailing conductor 28B is also covered by a removable protective cap 208. The caps 208 can be formed of any suitable material, e.g., a plastic or metal, and serve to protect the free end of the conductor on which they are mounted as the anode assembly is pulled through the ground during the installation. After that has been accomplished the caps can be removed to effect the electrical connection of the anode to the cathodic protection system.

The pulling cable 202 of the assembly 200 basically comprises a strong cable formed of any suitable material, e.g., 0.25 inch aircraft steel cable, which is over-braided with a metallic braid. Other suitable materials can be used in place of that type of cable. In any case, the cable 202 extends a substantial distance, e.g., 5 feet, from the leading end of the anode toward the trailing end of the anode. The cable is held tightly in place between the PVC braiding 42 on the anode and the inner surface of the wires making up the braided sleeve 206. To further secure the cable to the braided sleeve and the anode, the trailing end of the cable 202 includes a section of a heat shrink sleeve 210 tightly surrounding the trailing and of the cable. The heat shrink sleeve 210 is adhesively secured by a hot melt glue 212 (or any other suitable adhesive) to the inner surface of the braided sleeve 206 and the outer surface of PVC braid 42 on the anode.

In the exemplary embodiment of the anode assembly 200, the pulling cable includes a looped leading end portion 214. That loop is optional. If used, the loop 212 is formed by bending back the free leading end 202A of the pulling cable 202 securing it to another portion of the cable by use of a pair of crimp sleeves 216. Those crimp sleeves 216 can be formed of any suitable material, e.g., aluminum. If desired, the anode assembly 200 may make use of a break-away mechanism, like that described above. In any case the installation and use of the anode assembly 200 is accomplished in a similar manner to that described above.

As should be appreciated from the foregoing, the anode assemblies of this invention include various features that can significantly increase the anode's pulling strength and make it much more resistant to damage, thereby facilitating their installation The first feature is the use of one or more integral pulling cables attached to the packaged linear anode assembly. The pulling cable(s) consist of one or more pulling cables extending from the front of the anode or some distance along the linear anode. The pulling cable(s) is/are of smaller diameter cable than the linear anode package. The cable(s) are of steel, other metals or non-metallic cables and are mechanically secured to the packaged anode assembly. The cable(s) can run on the outside of the anode or could be embedded inside the anode. The pulling cable can also be formed by use of a braided sleeve which covers the anode and which has a leading portion extending from the leading end of the anode.

The second feature is a nose-cone. The nose-cone has particular utility when used in conjunction with an anode like the Matcor SPL-FBR anode or other similar type anodes. In this regard, the nose-cone provides a guide for the anode, the conductor cable and the pulling cable(s). The nose-cone's shape provides a clearing mechanism as the anode assembly is pulled through drilled soil. The nose cone is preferably formed by use of a braided sleeve, whose leading portion is tightly braided to form the nose cone. The braided sleeve in such a case extends the whole length of the anode, with a trailing end portion of the sleeve also being tightly braided to cover the trailing end portion of the anode, and with a looser braided intermediate portion located between the leading and trailing portions of the braided sleeve. Alternatively, the nose-cone may be formed of a solid walled tubular member which tapers in the direction of its leading end and which terminates in an open end through which the pulling cable and the anode's conductor can extend. In that type of arrangement the pulling cable may be formed by a braided sleeve as discussed above.

The third feature is an integral break-away mechanism, e.g., its calibrated pin or link, that will fail before the anode assembly pulling strength is exceeded. Should the pull force exceed the rated maximum pull strength of the calibrated pin on the breakaway mechanism, the pin will break preventing the anode assembly from being pulled further into the drilled hole and protecting the anode assembly from damage.

Thus, it should be clear to those skilled in the art that anode assemblies constructed in accordance with this invention are particularly well suited for HDD installation.

Without further elaboration the foregoing will so fully illustrate our invention that others may, by applying current or future knowledge, adopt the same for use under various conditions of service.

We claim:

1. An anode assembly arranged to be pulled through soil in the ground for installation in a cathodic protection system, said anode assembly comprising:
   an anode comprising an elongated body having a leading end and a trailing end, said leading end forming one end of said anode, said trailing end forming a second and opposite end of said anode;
   an electrical conductor comprising one portion extending from said leading end of said anode, and another portion extending from said trailing end of said anode;
   at least one pulling cable; and
   a nose cone comprising a tubular member formed of a plurality of closely adjacent coils of metal wires, said nose cone having a longitudinal axis, a leading portion having an outside diameter and a trailing portion having an outside diameter, said leading portion having an open free end on said longitudinal axis and a generally conical sidewall portion centered about said longitudinal axis and tapering in a direction from said trailing portion towards said open free end, said outside diameter at said open free end being less than the outside diameter of portions of said sidewall contiguous with said open free end and being symmetrical about said longitudinal axis so that said sidewall forms a smooth tapering surface without any projection therefrom, said nose cone being fixedly secured to said at least one pulling cable, said leading end of said anode being located within said nose cone with said electrical conductor extending out of said open free end, said at least one pulling cable having a leading portion and a trailing portion, said trailing portion of said at least one pulling cable extending along at least a portion of the length of said anode and through said nose cone, with said leading portion of said at least one pulling cable extending out of said open free end of said nose cone to enable said anode assembly to be pulled through the ground by a pulling force applied thereto, said generally conical sidewall portion of said nose cone serving as a smooth walled clearing mechanism for engaging the soil of the ground to facilitate the pulling of said anode assembly through the soil of the ground without any portion of said sidewall projecting outward therefrom which could impede the pulling of said anode assembly through the soil in the ground, whereupon said nose cone thereby enables increasing the pulling strength of the anode assembly, said nose cone being configured to protect said anode during the pulling of said anode assembly through the ground thereby rendering said anode resistant to damage.

2. The anode assembly of claim 1 wherein said nose cone comprises a braided sleeve comprising a first plurality of said closely adjacent coils, said first plurality of closely adjacent coils forming said generally conical sidewall portion of said nose cone.

3. The anode assembly of claim 2 wherein said braided sleeve additionally comprises a second plurality of closely adjacent coils, said second plurality of closely adjacent coils being located on said trailing end of said anode.

4. The anode assembly of claim 2 wherein said trailing portion of said at least one pulling cable is held between said nose cone and said anode.

5. The anode assembly of claim 1 wherein said trailing portion of said at least one pulling cable is adhesively secured to said anode.

6. The anode assembly of claim 5 wherein said at least one pulling cable includes a heat shrink sleeve located on said trailing portion thereof, and wherein said heat shrink sleeve is adhesively secured to said anode by a hot melt glue.

7. The anode assembly of claim 1 wherein said electrical conductor comprises a free end on which a protective cap is removably mounted.

8. The anode assembly of claim 2 wherein said braided sleeve is formed of steel wire, coated steel, carbon steel.

9. The anode assembly of claim 1 wherein said at least one pulling cable is formed of steel wire.

10. The anode assembly of claim 1 wherein said anode assembly has a predetermined pulling strength and wherein said anode assembly additionally comprise a break-away mechanism connected to said leading portion of said at least one pulling cable, said break-away mechanism being arranged to break if said predetermined pulling strength is reached to prevent damage to said anode assembly.

11. The anode assembly of claim 10 wherein said anode assembly includes a second pulling cable, said second pulling cable being connected to said break-away mechanism to apply a pulling force to said break-away mechanism and to said at least one pulling cable.

12. An anode assembly arranged to be pulled through the ground for installation in a cathodic protection system, said anode assembly comprising;
   an anode comprising an elongated body having a leading end portion from which an electrical conductor extends and a trailing end portion from which said electrical conductor extends;
   at least one pulling cable;
   a nose cone comprising a tubular member having a leading portion and a trailing portion, said leading portion having an open free end and a sidewall portion tapering in a direction from said trailing portion towards said open free end, said nose cone being fixedly secured to said at least one pulling cable, said leading end portion of said anode being located within said nose cone with said electrical conductor extending out of said open free end, said at least one pulling cable having a leading portion and a trailing portion, said trailing portion of said at least one pulling cable extending along at least a portion of the length of said anode and through said nose cone, with said leading portion of said at least one pulling cable extending out of said open free end of said nose cone to enable said anode assembly to be pulled through the ground by a pulling force applied thereto, said anode assembly having a predetermined pulling strength; and a break-away mechanism connected to said leading portion of said at least one pulling cable, said break-away mechanism being arranged to break if said predetermined pulling strength is reached to prevent damage to said anode assembly, wherein said anode assembly includes a second pulling cable, said second pulling cable being connected to said break-away mechanism to apply a pulling force to said break-away mechanism and to said at least one pulling cable, said break-away mechanism comprising a breakable pin located within a housing having a leading end portion to which said second pulling cable is secured.

13. The anode assembly of claim 12 wherein said housing is plastic and wherein said leading end of said housing is tapered and wherein said anode assembly additionally comprises a section of heat shrink tubing disposed about said housing and a portion of said at least one pulling cable.

14. A method of installing an anode within the ground for a cathodic protection system, said method comprising:
   a) providing an anode assembly comprising
      an anode comprising an elongated body having a leading end and a trailing end, said leading end forming one end of said anode, said trailing end forming a second and opposite end of said anode;
      an electrical conductor comprising one portion extending from said leading end of said anode, and another portion extending from said trailing end of said anode;
      at least one pulling cable; and
      a nose cone comprising a tubular member formed of a plurality of closely adjacent coils of metal wires, said nose cone having a longitudinal axis, a leading portion having an outside diameter and a trailing portion having an outside diameter, said leading portion having an open free end on said longitudinal axis and a generally conical sidewall portion centered about said longitudinal axis and tapering in a direction from said trailing portion towards said open free end, said outside diameter at said open free end being less than the outside diameter of portions of said sidewall contiguous with said open free end and being symmetrical about said longitudinal axis so that said sidewall forms a smooth tapering surface without any projection therefrom, said generally conical sidewall portion of said nose cone serving as a smooth walled clearing mechanism for engaging the soil of the ground to facilitate the pulling of said anode assembly through the soil of the ground without any portion of said sidewall projecting outward therefrom which could impede the pulling of said anode assembly through the soil in the ground, whereupon said nose cone thereby enables increasing the pulling strength of the anode assembly;
   b) disposing said leading portion of said anode within said nose cone with said electrical conductor extending out of said open free end and with said at least one pulling cable extending along at least a portion of the length of said anode and through said nose cone, whereupon a leading portion of said pulling cable extends out of said open free end of said nose cone;
   c) fixedly securing said nose cone to said at least one pulling cable;
   d) disposing the cable assembly within the ground; and
   e) applying a pulling force to said leading portion of said at least one pulling cable to pull said anode assembly through a path in the ground to effect its installation, said nose cone being configured to protect said anode during the pulling of said anode assembly through the ground thereby rendering said anode resistant to damage.

15. The method of claim 14 wherein said nose cone further comprises a braided sleeve comprising a first plurality of closely adjacent coils, said first plurality of closely adjacent coils forming said sidewall portion of said nose cone.

16. The method of claim 14 wherein said anode assembly has a predetermined pulling strength and wherein said method additionally comprises:
   f) providing a break-away mechanism connected to said portion of said at least one pulling cable extending out of said open free end of said nose cone, said break-away mechanism having a second pulling cable secured to it and being arranged to break if said predetermined pulling strength is reached to prevent damage to said anode assembly.

* * * * *